US010002587B2

(12) United States Patent
Mizushiro

(10) Patent No.: US 10,002,587 B2
(45) Date of Patent: Jun. 19, 2018

(54) DISPLAY APPARATUS AND METHOD FOR CONTROLLING DISPLAY APPARATUS

(71) Applicant: Seiko Epson Corporation, Tokyo (JP)

(72) Inventor: Kenji Mizushiro, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 14/532,598

(22) Filed: Nov. 4, 2014

(65) Prior Publication Data
US 2015/0130827 A1    May 14, 2015

(30) Foreign Application Priority Data

Nov. 8, 2013    (JP) ................................. 2013-231918

(51) Int. Cl.
| G09G 5/02 | (2006.01) |
| H04N 9/31 | (2006.01) |
| G09G 5/06 | (2006.01) |
| G09G 3/00 | (2006.01) |

(52) U.S. Cl.
CPC ................. *G09G 5/02* (2013.01); *G09G 5/06* (2013.01); *H04N 9/3182* (2013.01); *H04N 9/3194* (2013.01); *G09G 3/002* (2013.01); *G09G 2320/0666* (2013.01); *G09G 2320/0673* (2013.01); *G09G 2360/145* (2013.01)

(58) Field of Classification Search
None
See application file for complete search history.

(56) References Cited

U.S. PATENT DOCUMENTS

| 7,796,144 | B2* | 9/2010 | Huang | G09G 3/3607 345/690 |
| 2002/0097907 | A1* | 7/2002 | Fukasawa | H04N 1/6058 382/167 |
| 2004/0101195 | A1* | 5/2004 | Akaishi | H04N 1/58 382/162 |
| 2006/0170883 | A1* | 8/2006 | Matsui | G09G 3/3413 353/85 |
| 2007/0279433 | A1* | 12/2007 | Huang | G09G 3/3607 345/601 |
| 2008/0030629 | A1 | 2/2008 | Toyooka | |
| 2009/0015728 | A1 | 1/2009 | Abe et al. | |

(Continued)

FOREIGN PATENT DOCUMENTS

| JP | 2006-113151 A | 4/2006 |
| JP | 2007-219062 A | 8/2007 |

(Continued)

*Primary Examiner* — James A Thompson
(74) *Attorney, Agent, or Firm* — ALG Intellectual Property, LLC

(57) ABSTRACT

A display apparatus includes a display section that includes a light source and displays a displayed image based on image data and an image correction section that corrects the image data based on correction data. The image correction section corrects a color in the image by switching the correction data between first correction data which enables correction in which a displayed color in the displayed image conforms to a reference color and second correction data which enables correction in which a displayed color in the displayed image conforms to a color within an allowable range set in advance.

7 Claims, 10 Drawing Sheets

(56) References Cited

U.S. PATENT DOCUMENTS

| | | | |
|---|---|---|---|
| 2010/0053558 A1* | 3/2010 | Yanagisawa | G03B 21/142 353/20 |
| 2010/0128053 A1* | 5/2010 | Kato | G09G 5/06 345/589 |
| 2011/0164051 A1* | 7/2011 | Marcu | G09G 5/363 345/604 |

FOREIGN PATENT DOCUMENTS

| | | |
|---|---|---|
| JP | 2008-40073 A | 2/2008 |
| JP | 2008-209796 A | 9/2008 |
| JP | 2009-092983 A | 4/2009 |

\* cited by examiner

DISPLAY APPARATUS AND METHOD FOR CONTROLLING DISPLAY APPARATUS

The entire disclosure of Japanese Patent Application No. 2013-231918, filed Nov. 8, 2013, is expressly incorporated by reference herein.

BACKGROUND

1. Technical Field

The present invention relates to a display apparatus that displays an image and a method for controlling the display apparatus.

2. Related Art

To enhance color reproducibility of a display apparatus, there is a known method of related art for correcting a difference in displayed color due to characteristics of the display apparatus (see JP-A-2006-113151, for example). JP-A-2006-113151 discloses an example of a display apparatus that includes a display, such as a liquid crystal panel, a PDP, and an organic EL panel, and performs LUT-based correction (lookup-table-based correction) of a drive signal that drives the display to prevent instability or any other type of variation in white balance that occurs when grayscales are changed.

To correct a displayed color provided by a display apparatus, a decrease in brightness is problematic. That is, since a liquid crystal display panel and other displays have an upper limit of grayscale, color adjustment is so made that grayscales are lowered. The reason for this is that when the correction is so made that grayscales are raised, displaying a color having a maximum grayscale undesirably requires inputting a grayscale greater than the maximum grayscale due to the correction to the display. For example, in a liquid crystal display panel, to handle a phenomenon in which a color in a central portion of the screen thereof changes to a different color in a peripheral portion of the screen (what is called color unevenness), the displayed color in a bright portion of the screen is adjusted in accordance with the displayed color in a dark portion of the screen, resulting in an improvement in color uniformity at the sacrifice of brightness. In recent years, the luminance of a light source tends to be lowered for power conservation in some cases, and the decrease in the luminance undesirably causes a viewer to feel that the decrease in brightness due to the correction increases. A color correction method accompanied by a minimum amount of decrease in brightness is therefore desired.

SUMMARY

An advantage of some aspects of the invention is to provide a display apparatus capable of correcting a displayed color with a decrease in brightness suppressed and a method for controlling the display apparatus.

An aspect of the invention relates to a display apparatus including a display section that includes a light source and displays a displayed image based on image data and an image correction section that corrects the image data based on correction data, and the image correction section corrects a color in the image by switching the correction data between first correction data which enables correction in which a displayed color in the displayed image conforms to a reference color and second correction data which enables correction in which a displayed color in the displayed image conforms to a color within an allowable range set in advance.

The configuration described above enables correction in which a displayed color in the displayed image conforms to a reference color for high color reproducibility and color uniformity and correction in which a displayed color conforms to a color within an allowable range. When the correction in which a displayed color conforms to a color within the allowable range is performed, the displayed color can be so corrected that priority is placed, for example, on suppressing a decrease in brightness. In this case, since the color is corrected from the reference color to a color within the allowable range, there is no concern about degradation in color reproducibility or color uniformity. Therefore, two types of correction of a display color, that is, correction in which priority is placed on color reproducibility and color uniformity and correction in which priority is placed on suppressing a decrease in brightness, can be performed. Further, switching the two types of correction from one to the other allows priority to be placed, for example, on brightness or color reproducibility in accordance with user's request, whereby convenience to the user can be increased.

In the display apparatus according to the aspect of the invention described above, the display section may further include a modulation section that modulates light emitted from the light source based on the image data to produce image light, and the display section may display the displayed image formed by the image light, the display section may further include a light amount control section that controls the amount of the image light, and when the light amount control section reduces the amount of the image light, the image correction section may correct a color in the image by switching the correction data between the first correction data and the second correction data.

According to the configuration described above, when the amount of the image light that forms the displayed image is reduced, each displayed color can be corrected with a decrease in the brightness of the displayed image suppressed.

In the display apparatus according to the aspect of the invention described above, the first correction data may contain data which enables correction in which white in the displayed image in the case where the amount of the image light is reduced conforms to an achromatic color, and the second correction data may contain data which enables correction in which white in the displayed image in the case where the amount of the image light is reduced conforms to a color within the allowable range from a color having coordinates representing an achromatic color in an $L^*u^*v^*$ color space.

The configuration described above enables correction in which white in the displayed image conforms to an achromatic color for high color reproducibility and correction in which white in the displayed image is corrected to the extent that no unpleasant sensation occurs in such a way that, for example, a decrease in brightness is suppressed.

In the display apparatus according to the aspect of the invention described above, each of the first correction data and the second correction data may be a color unevenness correction LUT which enables correction of in-plane color unevenness in the displayed image, and the image correction section may use not only a gamma correction LUT which enables gamma correction of an image drawn by the display section based on the image data but also the color unevenness correction LUTs to correct the image.

According to the configuration described above, the combination of the gamma correction LUT and the color unevenness correction LUTs, which enables correction of in-plane color unevenness in the displayed image, enables color reproducibility of the displayed image to be enhanced and the color unevenness to be corrected in light-load processes for high-definition display.

In the display apparatus according to the aspect of the invention described above, the image correction section may correct a color in the image by switching the correction data between the first correction data formed of a plurality of sets of first correction data corresponding to the amount of the image light and the second correction data formed of a plurality of sets of second correction data corresponding to the amount of the image light.

According to the configuration described above, when the amount of the image light is changed, correction is so made in correspondence with the change that an image can be displayed with high color reproducibility and color uniformity.

In the display apparatus according to the aspect of the invention described above, the modulation section may modulate the light emitted from the light source by displaying an image based on the image data, and the image correction section may correct a color in the image displayed by the modulation section based on the first or second correction data.

According to the configuration described above, a projector that projects an image can perform two types of correction of a display color, that is, correction in which priority is placed on color reproducibility and color uniformity and correction in which priority is placed on suppressing a decrease in brightness.

The display apparatus according to the aspect of the invention described above may further include a correction data creation section that creates at least the second correction data based on a displayed color in the displayed image in the case where the light amount control section reduces the amount of the image light.

The configuration described above, using the correction data created by the display apparatus, enables different types of correction of a display color, that is, correction in which priority is placed on color reproducibility and color uniformity and correction in which priority is placed on suppressing a decrease in brightness. Color unevenness and color shift produced by time lapse changes in the light source and other components can therefore be appropriately corrected. Further, correction according to the environment in which the display apparatus is installed can be performed.

Another aspect of the invention relates to a method for controlling a display apparatus that includes a light source and displays a displayed image based on image data, the method including causing the light source to emit light, performing an image correction process of correcting a color in the displayed image based on correction data, and performing the correction in the image correction process by switching the correction data between first correction data which enables correction in which a displayed color in the displayed image conforms to a reference color and second correction data which enables correction in which a displayed color in the displayed image conforms to a color within an allowable range set in advance.

The method described above enables correction in which a displayed color in the displayed image conforms to a reference color for high color reproducibility and color uniformity and correction in which a displayed color conforms to a color within an allowable range. When the correction in which a displayed color conforms to a color within the allowable range is performed, the displayed color can be so corrected that priority is placed, for example, on suppressing a decrease in brightness. In this case, since the color is corrected from the reference color to a color within the allowable range, there is no concern about degradation in color reproducibility or color uniformity. Therefore, two types of correction of a display color, that is, correction in which priority is placed on color reproducibility and color uniformity and correction in which priority is placed on suppressing a decrease in brightness, can be performed. Further, switching the types of correction from one to the other allows priority to be placed, for example, on brightness or color reproducibility in accordance with user's request, whereby convenience to the user can be increased.

The aspects of the invention enables displayed color correction in which priority is placed on color reproducibility and color uniformity and displayed color correction in which priority is placed on suppressing a decrease in brightness.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment to which the invention is applied will be described below with reference to the drawings.

Figure 1:
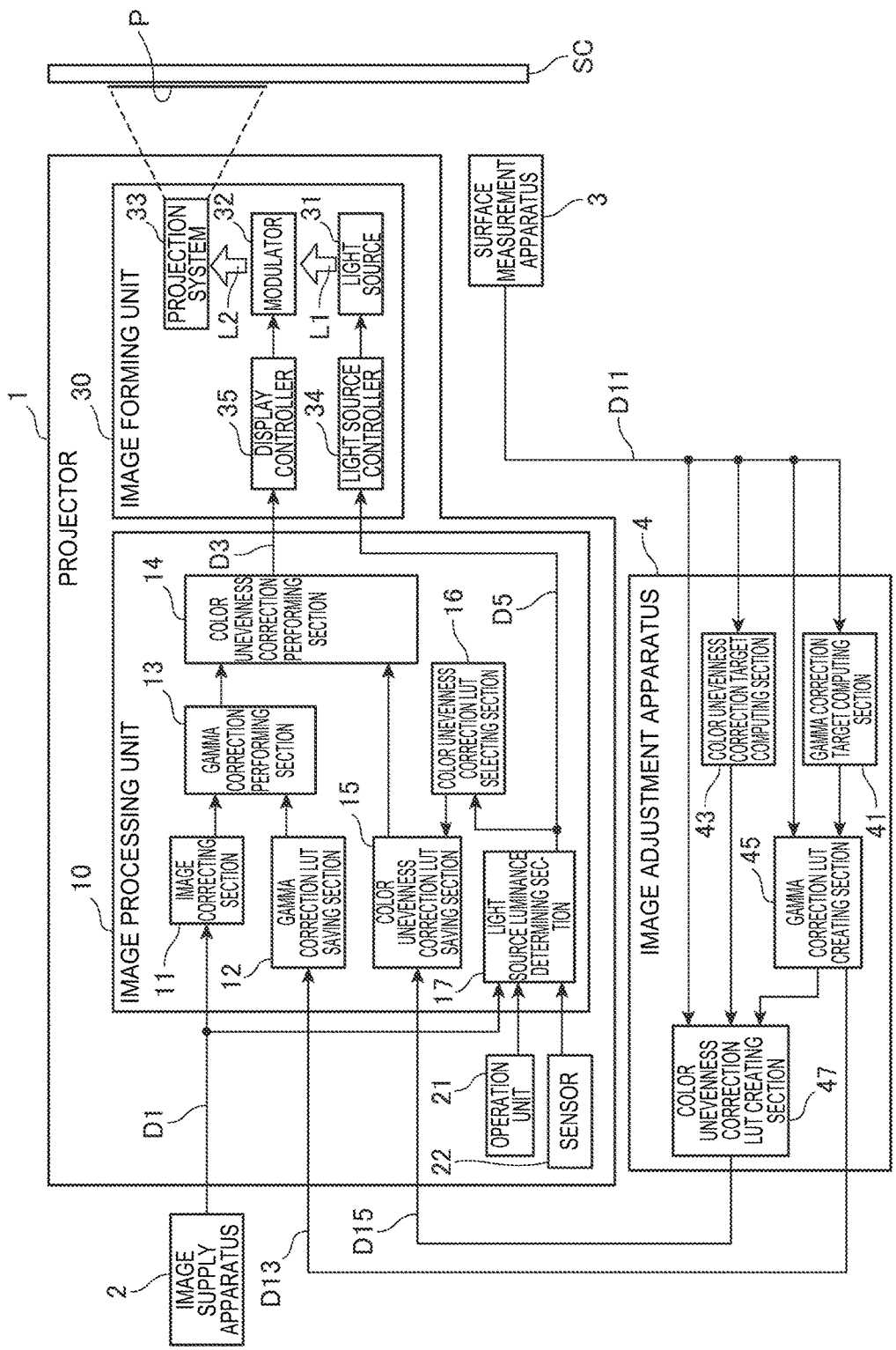
FIG. 1 is a functional block diagram of a projector according to an embodiment and peripheral apparatus.

FIG. 1 is a functional block diagram of a projector 1 according to the embodiment to which the invention is applied and a variety of peripheral apparatus connected to the projector 1.

An image supply apparatus 2, which outputs image data D1, is connected to the projector 1, which serves as a display apparatus. The image supply apparatus 2 outputs the image data D1, which contains still images or motion images, to the projector 1. The projector 1 projects a projected image P (displayed image) based on the image data D1 inputted from the image supply apparatus 2 onto a screen SC (projection surface).

The image supply apparatus 2 is selected, for example, from a DVD player or any other image reproduction apparatus, a digital TV tuner or any other broadcasting reception apparatus, a video game console, a personal computer, or any other video output apparatus, and a communication apparatus that communicates with a personal computer or any other apparatus and receives image data therefrom. The image supply apparatus 2 is not limited to an apparatus that outputs digital image data D1 and may be an apparatus that outputs an analog image signal. In this case, an A/D converter that creates digital image data D1 from an analog image signal is preferably provided on the output side of the image supply apparatus 2 or the input side of the projector 1. Further, an interface that connects the image supply apparatus 2 and the projector 1 to each other may have arbitrary specific specifications, and the number of interfaces for the connection is arbitrarily determined.

The projector 1 includes an image processing unit 10, which processes the image data D1 and outputs data D3 for formation of the projected image P, and an image forming unit 30, which projects an image based on the data D3 outputted from the image processing unit 10.

The image forming unit 30 (display section) includes a light source 31, a modulator 32 (modulation section), a projection system 33 (projection section), a light source controller 34 (light source control section), and a display controller 35.

The light source 31 is formed of a xenon lamp, an ultrahigh-pressure mercury lamp, or any other type of lamp, or an LED, a laser light source, or any other solid-state light source. The light source 31 is turned on when electric power is supplied from the light source controller 34 and emits light L1 toward the modulator 32. The light source controller 34 switches the luminance of the light emitted from the light source 31 (amount of light L1) in accordance with data D5, which will be described later, between rated luminance (100%) and attenuated luminance lower than the rated luminance. The light source controller 34 may instead switch the luminance among a plurality of different attenuated luminance levels. When the light source 31 is a lamp, the light source controller 34 can adjust the luminance by adjusting the voltage or current supplied to the light source 31. When the light source 31 is a solid-state light source, the light source controller 34 can adjust the luminance, for example, by performing PWM control.

The modulator 32 includes three liquid crystal light valves corresponding to the following colors: red (R); green (G); and blue (B). The modulator 32 causes the liquid crystal light valves to transmit the light L1 emitted from the light source 31 and guide the transmitted light to the projection system 33. The display controller 35 is connected to the liquid crystal light valves in the modulator 32. The display controller 35 drives pixels in each of the liquid crystal light valves to cause the liquid crystal light valve to draw an image on a frame (screen) basis. The light L1 is modulated by the image drawn on each of the liquid crystal light valves into image light L2, which is projected via the projection system 33 onto the screen SC and forms the projected image P on the screen SC.

A reflector that guides the light emitted from the light source 31 to the modulator 32 may be provided on the optical path between the light source 31 and the modulator 32 or in the modulator 32. Further, a group of lenses (not shown) for enhancing optical characteristics of the light emitted from the light source 31, a polarizer, or a light adjuster that attenuates the amount of light emitted from the light source 31 may be provided.

The modulator 32 may instead be formed of reflective liquid crystal panels. In this case, the modulator 32 causes the liquid crystal panels to reflect the light L1 and guide the reflected light to the projection system 33. Still instead, the modulator 32 may be formed of digital mirror devices (DMDs) or may be formed of a single DMD and a color wheel.

The projection system 33 includes a variety of optical elements that guide the modulated image light L2 from the modulator 32 and focuses the light L2 on the screen SC. The optical elements provided in the projection system 33 include a prism that combines the light fluxes having traveled via the three liquid crystal light valves with one another and a group of lenses and mirrors that guide the image light L2. Further, the projection system 33 may include a zoom lens that enlarges or shrinks the projected image P and performs focus adjustment, a zoom adjustment motor that adjusts the degree of zooming, and a focus adjustment motor that adjusts focusing.

The image processing unit 10 carries out processes of correcting the image data D1 inputted from the image supply apparatus 2. The image processing unit 10 carries out, for example, a resolution conversion process of matching the resolution of the image data D1 with that of the liquid crystal light valves in the modulator 32, a frame rate conversion process, and a distortion correction process of correcting trapezoidal distortion and barrel distortion. Image data processed by an image correcting section 11 is inputted to a gamma correction performing section 13.

The gamma correction performing section 13 and a color unevenness correction performing section 14 function as an image correction section and correct color shift and color unevenness in the projected image P to enhance color reproducibility and color uniformity. That is, the color characteristic and other properties of the liquid crystal light valves provided in the modulator 32 cause color shift to occur in the projected image P. The color shift also occurs when the luminance of the light source 31 is changed. For example, a color in the projected image P produced when the light source 31 is caused to emit rated light changes to a different color when the light source 31 is caused to emit attenuated light. Further, in the projected image P, there is a color difference between a central portion and a peripheral portion. The image processing unit 10 corrects the color shift and the color unevenness in LUT-based processes.

The gamma correction performing section 13 performs gamma correction on the image data corrected by the image correcting section 11 to compensate the color shift produced by the liquid crystal light valves provided in the modulator 32. A gamma correction LUT saving section 12, which is formed of an SRAM or any other storage device and stores one or more LUTs, is connected to the gamma correction performing section 13. The gamma correction performing section 13 reads the gamma correction LUTs from the gamma correction saving section 12, performs gamma correction based on the gamma correction LUTs, and outputs corrected image data to the color unevenness correction performing section 14. In the present embodiment, the gamma correction performing section 13 performs the gamma correction on the entire pixels that form single-frame image data inputted from the image correcting section 11.

The color unevenness correction performing section 14 performs correction on the image data inputted from the gamma correction performing section 13 to compensate the difference in color, that is, color unevenness between a central portion and a peripheral portion (periphery) of a single frame.

A color unevenness correction LUT saving section 15, which is formed of an SRAM or any other storage device and stores a plurality of LUTs, is connected to the color unevenness correction performing section 14. The color unevenness correction performing section 14 in the present embodiment performs correction on the entire pixels in a frame formed by inputted image data and the correction is performed in correspondence with the position of each of the pixels. The LUTs used by the color unevenness correction performing section 14 contain data which enables correction of the grayscales at the pixels in the frame on a pixel position basis, more specifically, contain data that define post-correction grayscales in relation to the coordinates of and the grayscales at the pixels in the frame not only on a coordinate basis but also on a grayscale basis. Each of the LUTs does not necessarily contain data corresponding to the entire coordinates or grayscales and only needs to contain data corresponding to the coordinates of and the grayscales at a predetermined number of representative points in the frame. In this case, the color unevenness correction performing section 14 may perform the correction on the representative points in accordance with the data in the LUTs and perform the correction on the pixels located between the representative points and the grayscales of the pixels by performing linear interpolation, curved interpolation, or any other type of interpolation to determine grayscales after the correction.

The correction made by the color unevenness correction performing section 14 is a process of changing a color in a peripheral portion of the projected image P to the corresponding color in a central portion thereof in such a way that the difference in color between the central portion of the projected image P and the peripheral portion thereof is eliminated or reduced. It can therefore be said that the color unevenness correction performing section 14 increases, in accordance with the position and grayscale of each of the pixels, the amount of correction (LUT value) of the grayscale having undergone the gamma correction performed by the gamma correction performing section 13. It can therefore be said that the LUTs used by the color unevenness correction performing section 14 contain the amount of increase corresponding to the coordinate and grayscale of each of the pixels.

Figure 2A:
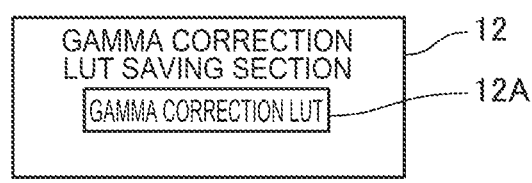
FIGS. 2A and 2B describe LUT saving sections provided in the projector.
Figure 2B:
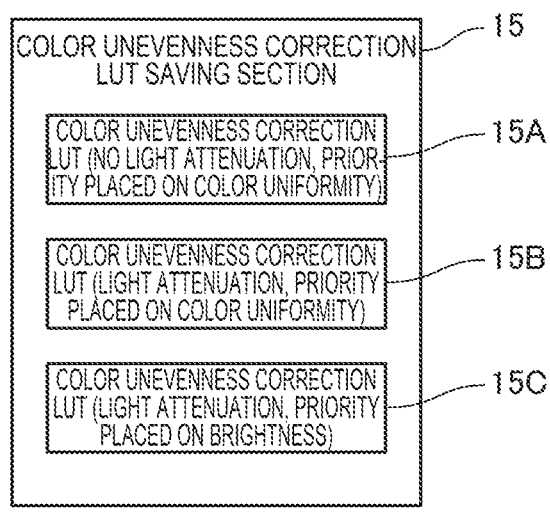

FIGS. 2A and 2B describe the gamma correction LUT saving section 12 and the color unevenness correction LUT saving section 15. FIG. 2A diagrammatically shows a state in which the gamma correction LUT saving section 12 stores an LUT, and FIG. 2B diagrammatically shows a state in which the color unevenness correction LUT saving section 15 stores LUTs.

The gamma correction LUT saving section 12 stores a gamma correction LUT 12A. The gamma correction LUT 12A contains data for correcting a color in the projected image P to a correct displayed color specified by the image data D1 in accordance with the color characteristic of the liquid crystal light valves provided in the modulator 32. The gamma correction LUT saving section 12 stores at least one gamma correction LUT 12A, as shown in FIG. 2A. The gamma correction performing section 13 uses the gamma correction LUT 12A to increase the number of grayscales in the image data inputted from the image correcting section 11 and rearrange the image data.

The color unevenness correction LUT saving section 15 stores a plurality of color unevenness correction LUTs, as shown in FIG. 2B. In the example shown in FIG. 2B, the color unevenness correction LUT saving section 15 stores three color unevenness correction LUTs 15A to 15C.

The color unevenness correction LUT 15A in the present embodiment is an LUT used when the light source 31 emits rated light (100% luminance), that is, without light attenuation. The color unevenness correction LUT 15A contains data for correction in which priority is placed on increasing color uniformity and therefore lowers the brightness of the projected image P after the correction in some cases.

The color unevenness correction LUT 15B is an LUT used when the light source 31 emits light of luminance lower than the rated luminance, that is, when the light source 31 emits attenuated light. The color unevenness correction LUT 15B contains data for correction in which priority is placed on increasing color uniformity and therefore lowers the brightness of the projected image P after the correction in some cases. The color unevenness correction LUT 15B, however, not only achieves high color uniformity with a small difference in color between a central portion of the projected image P and a peripheral portion thereof but also allows a color in the projected image P to be close to a reference color or achieves enhanced reproducibility. When the luminance of the light source 31 is made lower than the rated luminance, the characteristics of the liquid crystal light valves may cause a difference in color in the projected image P from the color in the case of 100% luminance, but the color unevenness correction LUT 15B enables correction of the difference in color. The color unevenness correction LUT 15B can therefore prevent degradation in color reproducibility, for example, when the luminance of the light source 31 is lowered for power conservation.

The color unevenness correction LUT 15C is an LUT used when the light source 31 emits light of luminance lower than the rated luminance, that is, when the light source 31 emits attenuated light and contains data for correction in which the color uniformity is enhanced with a minimum decrease in brightness. When the color unevenness correction performing section 14 performs correction based on the color unevenness correction LUT 15C, the color uniformity and the color reproducibility of the projected image P fall within acceptable ranges. In other words, the color unevenness correction performing section 14 performs correction in such a way that color unevenness in the projected image P and degradation in color reproducibility thereof are tolerated to the extent that they fall within acceptable ranges and a decrease in brightness of the projected image P after the correction is suppressed.

Figure 3:
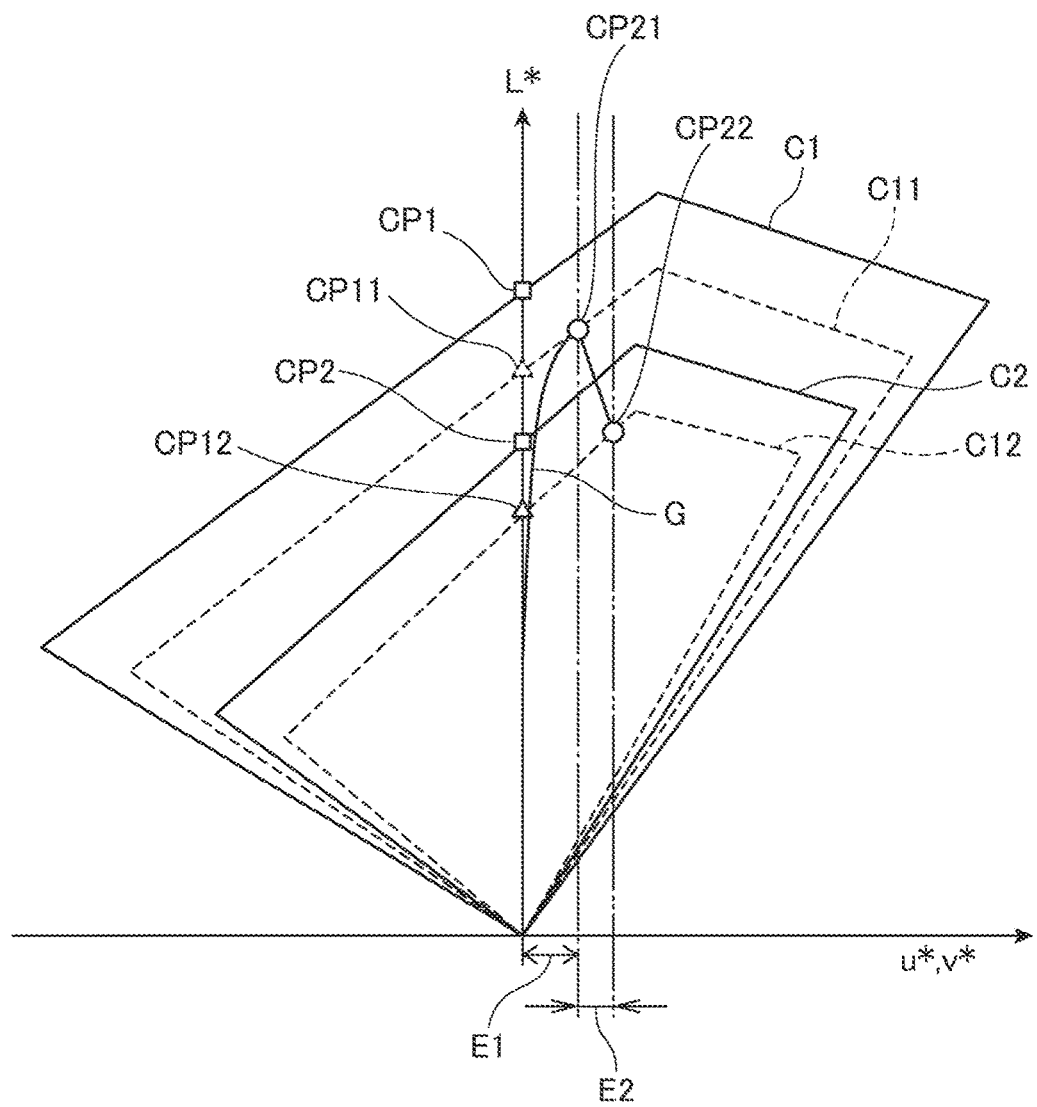
FIG. 3 describes LUTs stored in the projector.

FIG. 3 describes the color unevenness correction LUTs stored in the color unevenness correction LUT saving section 15.

FIG. 3 shows color gamuts in an L*u*v* colorimetric system having the L* axis assigned as the vertical axis and the u*v* axes assigned as the horizontal axis. The vertical axis at the center of FIG. 3 corresponds to a gray axis, and colors on this axis include achromatic colors, that is, black, gray, and white.

In FIG. 3, the solid lines represent color gamuts (color reproduction gamuts) of the projected image P in the case where the luminance of the light source 31 is set at 100%. A color gamut C1 is a color gamut at the center of the projected image P, and a color gamut C2 is a color gamut in a peripheral portion of the projected image P. Further, in FIG. 3, the broken lines represent color gamuts of the projected image P in the case where the luminance of the light source 31 is set at a smaller value (80%, for example). A color gamut C11 is a color gamut at the center of the projected image P, and a color gamut C12 is a color gamut in the peripheral portion of the projected image P. The color gamuts C1, C2, C11, and C12 are examples for ease of description and do not limit the scope of the invention.

A description will first be made of colors in the central portion of the projected image P in the case where the light from the light source 31 is not attenuated. In the color gamut C1, the brightest color on the L* axis is the color at a point CP1. The color at the point CP1 is the closest to white in the color gamut C1. Colors in the peripheral portion of the projected image P are those within the color gamut C2 in the case where the light from the light source 31 is not attenuated. The color gamut C2 is smaller than the color gamut C1, and the colors in the color gamut C2 are less bright than those in the color gamut C1. In the color gamut C2, the color closest to white is the brightest color on the L* axis, that is, the color at a point CP2.

The color unevenness correction LUT 15A is an LUT determined by setting target values of a color having grayscales corresponding to white (8-bit grayscales (R, G, B)= (256, 256, 256), for example) to be the values of the color at CP1 in the central portion of the projected image P and setting target values of a color having grayscales corresponding to white to be the values of the color at CP2 in the peripheral portion of the projected image P. Using the color unevenness correction LUT 15A enables white in the central portion of the projected image P in the case where the luminance of the light source 31 is set at 100% to be corrected to the color at the point CP1 or a color substantially equal thereto. Further, white in the peripheral portion of a frame that forms the projected image P is corrected to the color at the point CP2 or a color substantially equal thereto.

Colors in the central portion of the projected image P in the case where the light from the light source 31 is attenuated are selected from those in the color gamut C11. In the color gamut C11, the brightest color on the L* axis is the color at a point CP11. Colors in the peripheral portion of the projected image P in the case where the light from the light source 31 is attenuated are selected from those in the color gamut C12, and the brightest color on the L* axis in the color gamut C12 is the color at a point CP12. The color unevenness correction LUT 15B is an LUT determined by setting target values of a color having grayscales corresponding to white to be the values of the color at CP11 in the central portion of the projected image P and setting target values of a color having grayscales corresponding to white to be the values of the color at CP12 in the peripheral portion of the projected image P. Using the color unevenness correction LUT 15B enables white in the central portion of the projected image P in the case where the light from the light source 31 is attenuated to be corrected to the color at the point CP11 or a color substantially equal thereto. Further, white in the peripheral portion of the frame that forms the projected image P is corrected to the color at the point CP12 or a color substantially equal thereto.

The color unevenness correction LUT 15B, which conforms white in each of the color gamuts C11 and C12 to a color on the L* axis, enables correction that provides excellent color reproducibility and produces no difference in color between the central portion and the peripheral portion of the projected image P. On the other hand, the positions of white are shifted downward along the L* axis as compared with the positions of white in the color gamuts C1 and C2, and it cannot be said that a decrease in brightness is small. It can therefore be said that the color unevenness correction LUT 15B is an LUT capable of correction in which priority is placed on color uniformity but a decrease in brightness is tolerated.

If white is allowed to be separate from the gray axis (L* axis), the target values can be the values of a color brighter than the colors at the points CP11 and CP12. For example, when the target values are set to be the values at a point that is separate from the L* axis but falls within an allowable range E1, the brightest point in the color gamut C11 is a point CP21. Setting the target values to be the values of the color at the point CP21 allows each color in the projected image P to be corrected to a brighter color. Since the point CP21 is not on the L* axis, it cannot be said that the color at CP21 is an achromatic color in an exact sense, but each color that falls within the preset range E1 is perceived by human vision as a substantially achromatic color without unpleasant sensation. Therefore, using the color unevenness correction LUT 15C created by setting the target values to be the values of the color at CP21 allows each color in the central portion of the projected image P to be corrected to a bright color without unpleasant sensation.

Each color in the peripheral portion of the projected image P can also be corrected to a brighter color by setting the target values to be the values of a color separate from the L* axis. To correct a color in the peripheral portion, the target values are set to be the values of the brightest color within an allowable range E2 set in advance with respect to the target values in the central portion (those at CP21 in the description). The allowable range E2 is set in advance as a range over which the color uniformity of the projected image P is allowable.

As described above, using the color unevenness correction LUT 15C created by setting the target values to be the values at the points CP21 and CP22 enables correction in which the color reproducibility and color uniformity of the projected image P are enhanced with a decrease in brightness suppressed. Although using the color unevenness correction LUT 15B is superior in terms of color uniformity, the differences in brightness between CP11 and CP21 and between CP12 and CP22 in FIG. 3 clearly show that using the color unevenness correction LUT 15C allows a decrease in brightness to be suppressed.

A plurality of sets of specific values of the allowable ranges E1 and E2 are preferably set in correspondence with the luminance of the light source 31. The reason for this is that the degree of white color shift perceived by a human varies with the luminance of the light source 31.

As described above, the color unevenness correction LUT saving section 15 stores the plurality of color unevenness correction LUTs 15A to 15C in accordance with the luminance of the light source 31. Further, the color unevenness correction LUT saving section 15 stores the plurality of color unevenness correction LUTs 15B and 15C in correspondence with the correction in which priority is placed on the color uniformity of the projected image P and the correction in which priority is placed on the brightness thereof, respectively. The color unevenness correction performing section 14, which uses the color unevenness correction LUTs by switching one to another, can perform appropriate correction and achieve high-definition display in correspondence with user's requirements, the environment in which the projector 1 is installed, and other factors.

When each of the gamma correction LUT saving section 12 and the color unevenness correction LUT saving section 15 is formed of an SRAM or any other volatile storage device, an LUT storing section that stores the gamma correction LUT 12A and the color unevenness correction LUTs 15A to 15C in an nonvolatile manner may be provided in the image processing unit 10. In this case, after the projector 1 is powered on, the gamma correction LUT 12A is loaded from the LUT storing section (not shown) to the gamma correction LUT saving section 12, and the color unevenness correction LUTs 15A to 15C are loaded from the LUT storing section to the color unevenness correction LUT saving section 15.

A color unevenness correction LUT selecting section 16 is connected to the color unevenness correction LUT saving section 15, as shown in FIG. 1. The color unevenness correction LUT selecting section 16 selects a color unevenness correction LUT used by the color unevenness correction performing section 14 from the plurality of color unevenness correction LUTs 15A to 15C stored in the color unevenness correction LUT saving section 15. The color unevenness correction LUT selected by the color unevenness correction LUT selecting section 16 is outputted from the color unevenness correction LUT saving section 15 to the color unevenness correction performing section 14 and used for the correction.

Data D5 outputted from a light source luminance determining section 17 is inputted to the color unevenness correction LUT selecting section 16. The light source luminance determining section 17 carries out a process of determining the luminance of the light emitted from the light source 31 and outputs the image data D1 representing the determined luminance. The color unevenness correction LUT selecting section 16 selects an LUT based on the luminance of the light source 31 determined by the light source luminance determining section 17.

An operation unit 21, which accepts user's input operation, and a sensor 22, which detects the brightness in at the location where the projector 1 or the screen SC is installed, are connected to the light source luminance determining section 17. The operation unit 21 can be formed as an infrared light receiver that receives signals from an operation panel and a remote control (not shown) on which switches are provided. The sensor 22 is an illuminance sensor provided, for example, on an enclosure of the projector 1. A signal representing user's operation detected by the operation unit 21 and a detected value from the sensor 22 are inputted to the light source luminance determining section 17. The light source luminance determining section 17 can determine the luminance of the light source 31 based on the user's operation, the detected value from the sensor 22, and the image data D1 inputted from the image supply apparatus 2. For example, when the user directly specifies the luminance of the light source 31, the luminance can be determined based on the specified value. On the other hand, when the image data D1 contains data on dark video images or when the surrounding brightness detected with the sensor 22 is low, for example, the luminance of the light source 31 is lowered. The luminance of the light source 31 determined by the light source luminance determining section 17 is outputted as the data D5 to the color unevenness correction LUT selecting section 16 and the light source controller 34.

The gamma correction LUT 12A and the color unevenness correction LUTs 15A to 15C are created by an image adjustment apparatus 4.

The image adjustment apparatus 4 is connected to a surface measurement apparatus 3, which detects the colors in the projected image P on the screen SC. The image adjustment apparatus 4 includes a gamma correction target computing section 41, a color unevenness correction target computing section 43, a gamma correction LUT creating section 45, and a color unevenness correction LUT creating section 47, each of which carries out a process based on data D11 outputted from the surface measurement apparatus 3.

The surface measurement apparatus 3 and the image adjustment apparatus 4 are installed, for example, in a step before the projector 1 is shipped and connected to the projector 1.

The surface measurement apparatus 3 includes an image sensor formed, for example, of a CCD or a CMOS device, captures the projected image P projected by the projector 1, and creates in-plane two-dimensionally distributed image data on XYZ tristimulus values from the captured image data. The surface measurement apparatus 3 creates data D11 representing the color characteristic (VT characteristic) in each position of the screen of the projected image P from the created in-plane two-dimensionally distributed image data and outputs the data D11 to the image adjustment apparatus 4.

In the configuration in which the surface measurement apparatus 3 captures the projected image P, a computer is connected as the image supply apparatus 2 to the projector 1, and the computer outputs, as the image data D1, data on pattern images for the surface measurement. The pattern images are formed of RGB single-color images that are uniform thereacross (raster images), and each of the pattern images is displayed at each grayscale to be measured. The computer, which serves as the image supply apparatus 2, runs software to produce the pattern images or reads and outputs pattern images prepared in advance. Further, the computer, which serves as the image supply apparatus 2, may control the surface measurement apparatus 3 in such a way that the display of the pattern images is synchronized with the image capturing performed by the surface measurement apparatus 3. Moreover, the computer, which serves as the image supply apparatus 2, may control the luminance of the light source 31 when the projector 1 projects the pattern images.

The gamma correction target computing section 41 determines target XYZ values used to create the gamma correction LUT 12A based on a target color space (sRGB, for example) and the color characteristic contained in the data D11.

The color unevenness correction target computing section 43 determines target XYZ values for the color unevenness correction based on the data on the color characteristic contained in the data D11 inputted from the surface measurement apparatus 3, as shown in FIG. 1. The color unevenness correction target computing section 43 determines the target XYZ values in accordance with the luminance of the light source 31 and whether priority is placed on color uniformity or brightness. For example, the target XYZ values are determined for each of the following cases: a case where the color unevenness correction LUT 15A is created under the condition that the light from the light source 31 is not attenuated; a case where the color unevenness correction LUT 15B is created under the condition that priority is placed on color uniformity; and a case where the color unevenness correction LUT 15C is created under the condition that priority is placed on brightness.

The gamma correction LUT creating section 45 creates the gamma correction LUT 12A based on the target XYZ values determined by the gamma correction target computing section 41. Specific processes carried out by the gamma correction LUT creating section 45 can, for example, be those in the known method described in JP-A-2006-113151 mentioned above.

The color unevenness correction LUT creating section 47 creates the color unevenness correction LUTs 15A to 15C based on the target XYZ values determined by the color unevenness correction target computing section 43. Specific processes carried out by the color unevenness correction LUT creating section 47 can, for example, be those in the known method described in JP-A-2006-113151 mentioned above.

The image adjustment apparatus 4 outputs the gamma correction LUT 12A created by the gamma correction LUT creating section 45 as data D13 to the gamma correction LUT saving section 12 and causes the gamma correction LUT saving section 12 to store the gamma correction LUT 12A. The image adjustment apparatus 4 further outputs the color unevenness correction LUTs 15A to 15C created by the color unevenness correction LUT creating section 47 as data D15 to the color unevenness correction LUT saving section 15 and causes the color unevenness correction LUT saving section 15 to store the color unevenness correction LUTs 15A to 15C. The projector 1 can therefore correct image data in correspondence with the characteristics of the modulator 32, whereby the color reproducibility and color uniformity of the image data can be improved. Further, before each projector 1 is shipped, the image adjustment apparatus 4 creates LUTs associated with the projector 1, and the thus created LUTs correspond to an individual difference associated with the projector 1, whereby the color reproducibility and color uniformity of each projector 1 can be improved.

FIG. 1 shows the configuration in which the surface measurement apparatus 3 and the image adjustment apparatus 4 are connected to the projector 1 as apparatus external thereto byway of example, but the projector 1 can instead include the surface measurement apparatus 3 and the image adjustment apparatus 4. In this case, the surface measurement apparatus 3 only needs to be capable of capturing the projected image P on the screen SC, and an imaging section (not shown) for trapezoidal distortion correction may be provided in the projector 1 and can be used to capture the projected image P. Further, a CPU or any other processor that forms the image processing unit 10 can run software to achieve the function of each of the sections in the image adjustment apparatus 4. Moreover, the pattern images outputted from the image supply apparatus 2 to the projector 1 may instead be stored in the image processing unit 10. In this case, the projector 1 alone can create the gamma correction LUT 12A and the color unevenness correction LUTs 15A to 15C. In this case, the LUTs can be created even after the projector 1 is installed as well as correction corresponding to the color characteristic of each projector 1 can be performed. An optimum gamma correction LUT 12A and color unevenness correction LUTs 15A to 15C can therefore be used to correct image data in correspondence with time lapse changes in the characteristics of the light emitted from the light source 31 and the color characteristic of the modulator 32 provided in the projector 1. Further, even when the light source 31 is replaced, LUTs corresponding to a change in the characteristics of the light emitted from the light source 31 can be advantageously created.

Figure 4:
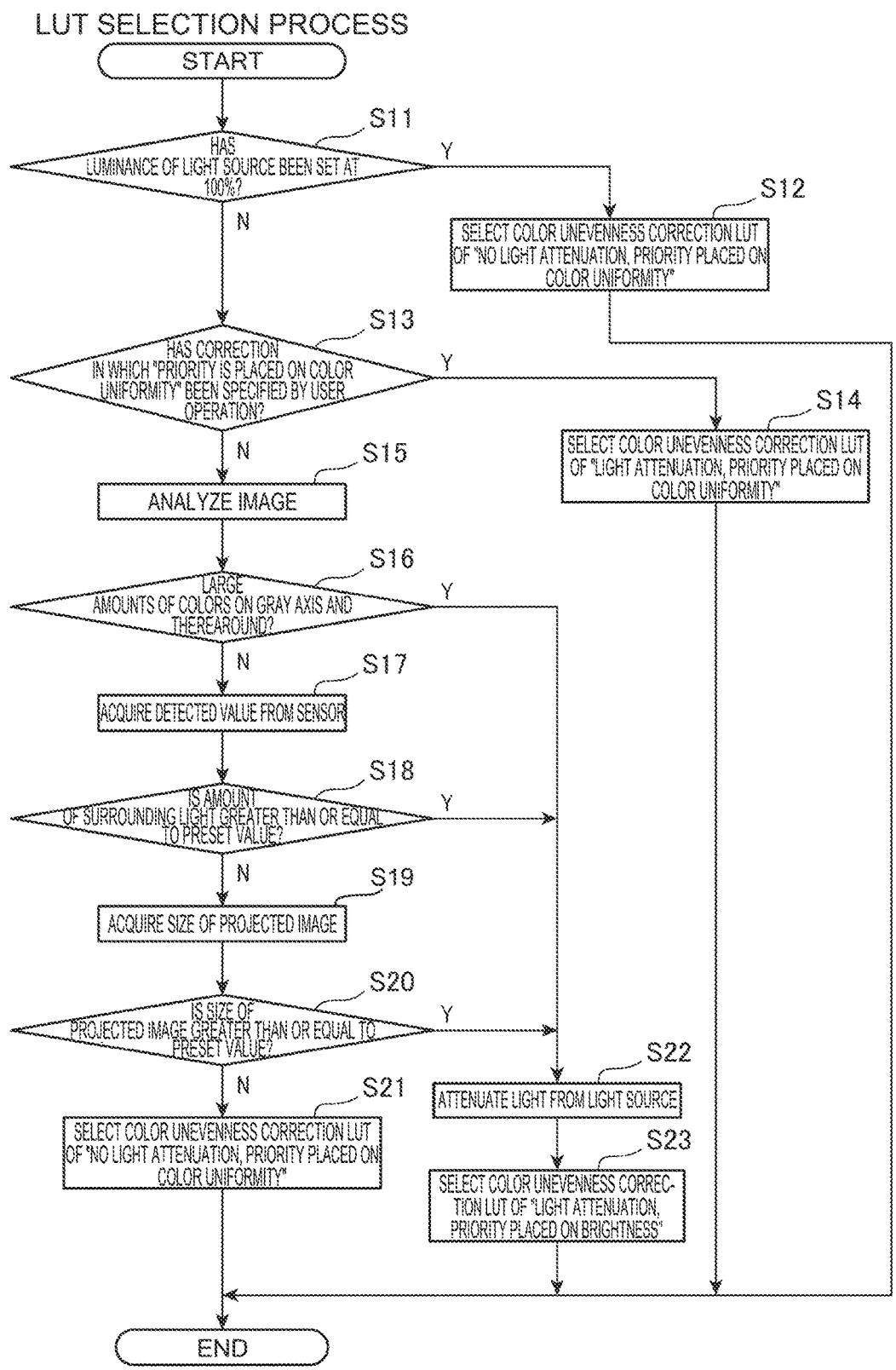
FIG. 4 is a flowchart showing the action of the projector.

FIG. 4 is a flowchart showing the action of the projector 1. More specifically, FIG. 4 shows a LUT selection process of selecting an LUT from the color unevenness correction LUTs 15A to 15C stored in the color unevenness correction LUT saving section 15.

The projector 1 carries out the LUT selection process shown in FIG. 4 when image projection is initiated or during image projection. For example, when the projector 1 is powered on, when the image data D1 is inputted from the image supply apparatus 2, or when the user operates the operation unit 21 to instruct initiation of image projection, the LUT section process is carried out. Instead, the projector 1 may carry out the LUT selection process during projection of the projected image P and whenever a preset period elapses.

The image processing unit 10 first uses the function of the light source luminance determining section 17 to evaluate whether or not the luminance of the light source 31 has been set at 100% by operation or presetting made through the operation unit 21 (step S11). An example of the operation of the operation unit 21 is setting operation using a setting menu screen provided by the projector 1.

When the luminance of the light source has been set at 100% (Yes in step S11), the color unevenness correction LUT selecting section 16 selects the color unevenness correction LUT 15A corresponding to 100% luminance and causes the color unevenness correction LUT saving section 15 to output the color unevenness correction LUT 15A to the color unevenness correction performing section 14 (step S12).

On the other hand, when the luminance of the light source has not been set at 100% (No in step S11), the image processing unit 10 evaluates whether or not it has been specified by operation or presetting made through the operation unit 21 that correction in which priority is placed on color uniformity is performed (step S13). When it has been specified that correction in which priority is placed on color uniformity is performed (Yes in step S13), the color unevenness correction LUT selecting section 16 selects the color unevenness correction LUT 15B for correction in which priority is placed on color uniformity and causes the color unevenness correction LUT saving section 15 to output the color unevenness correction LUT 15B to the color unevenness correction performing section 14 (step S14).

When it has not been specified that correction in which priority is placed on color uniformity is performed (No in step S13), the image processing unit 10 uses the light source luminance determining section 17 to analyze the image data D1 (step S15). At this point, the image processing unit 10 evaluates whether or not the image data D1 contains large amounts of colors on the gray axis (achromatic colors) and colors close to the gray axis (step S16). In step S16, the evaluation is made based, for example, on the RGB grayscales at each pixel in a single frame by comparison of the proportion of pixels having achromatic colors and pixels having colors close to achromatic colors with a preset threshold.

When large amounts of colors on the gray axis (achromatic colors) and colors close to the gray axis are present (Yes in step S16), the image processing unit 10 proceeds to step S22, which will be described later.

When large amounts of colors on the gray axis (achromatic colors) and colors close to the gray axis are not present (No in step S16), the image processing unit 10 acquires a detected value from the sensor 22 (step S17). The detected value from the sensor 22 is an index of the brightness at the location where the projector 1 is installed. The image processing unit 10 evaluates whether or not the amount of surrounding light derived from the detected value from the sensor 22 is greater than or equal to a preset value (step S18). When the amount of surrounding light is greater than or equal to the preset value (Yes in step S18), the image processing unit 10 proceeds to step S22, which will be described later. When the amount of surrounding light is smaller than the preset value (No in step S18), the image processing unit 10 acquires the size of the projected image P on the screen SC (step S19). The size of the projected image P can be acquired based on the setting set through operation performed on the operation unit 21 and the state of the projection system 33. Instead, when the projector 1 includes an imaging section (not shown) that captures an image of the screen SC for trapezoidal distortion correction, the imaging section can be used to detect the size of the projected image P. The image processing unit 10 evaluates whether or not the size of the projected image P is greater than or equal to a preset value (step S20) and proceeds to step S22, which will be described later, when the size of the projected image P is greater than or equal to the preset value (Yes in step S20).

When the size of the projected image P is smaller than the preset value (No in step S20), the image processing unit 10 uses the color unevenness correction LUT selecting section 16 to select the color unevenness correction LUT 15A (step S21) and terminates the LUT selection process.

In step S22, the image processing unit 10 uses the function of the light source luminance determining section 17 to change the luminance of the light source 31 to be lower than the rated luminance, uses the color unevenness correction LUT selecting section 16 to select the color unevenness correction LUT 15C, and terminates the LUT selection process.

In the LUT selection process, when the luminance of the light source 31 has been set at 100%, the condition is maintained, and the color unevenness correction LUT 15A corresponding to 100% luminance is selected. When the luminance of the light source 31 has not been specified, the light from the light source 31 can be attenuated. In this case, when large amounts of achromatic colors are present in a frame, when a large amount of surrounding light is present, and when the size of the projected image P is large, the light from the light source 31 is attenuated, and then the color unevenness correction LUT 15C for correction in which priority is placed on brightness is selected. In these situations, even when the brightness of the projected image P decreases, a viewer who looks at the projected image P is likely to feel no unpleasant sensation. Further, using the color unevenness correction LUT 15C for correction in which priority is placed on brightness enables image correction with no decrease in the brightness of the projected image P, whereby the luminance of the light from the light source 31 can be lowered with a less amount of unpleasant sensation, for example, for power conservation.

The projector 1 according to the embodiment of the invention does not necessarily carry out all the steps shown in FIG. 4 and may instead carry out only part thereof. That is, one of the action of steps S11 to S12 and the action of steps S13 to S14 may be performed, or none of them may be performed. Further, at least one of the evaluation in steps S15 to S16, the evaluation in steps S17 to S18, and the evaluation in steps S19 to S20 may be made. Moreover, all the evaluation steps may be omitted, and one or both of the action of steps S11 to S12 and the action of steps S13 to S14 may be performed.

FIGS. 5 to 10 are flowcharts showing processes carried out by the image adjustment apparatus 4 to create the gamma correction LUT 12A and the color unevenness correction LUTs 15A to 15C. The LUT creation processes will be described with reference to FIGS. 5 to 10.

Figure 5:
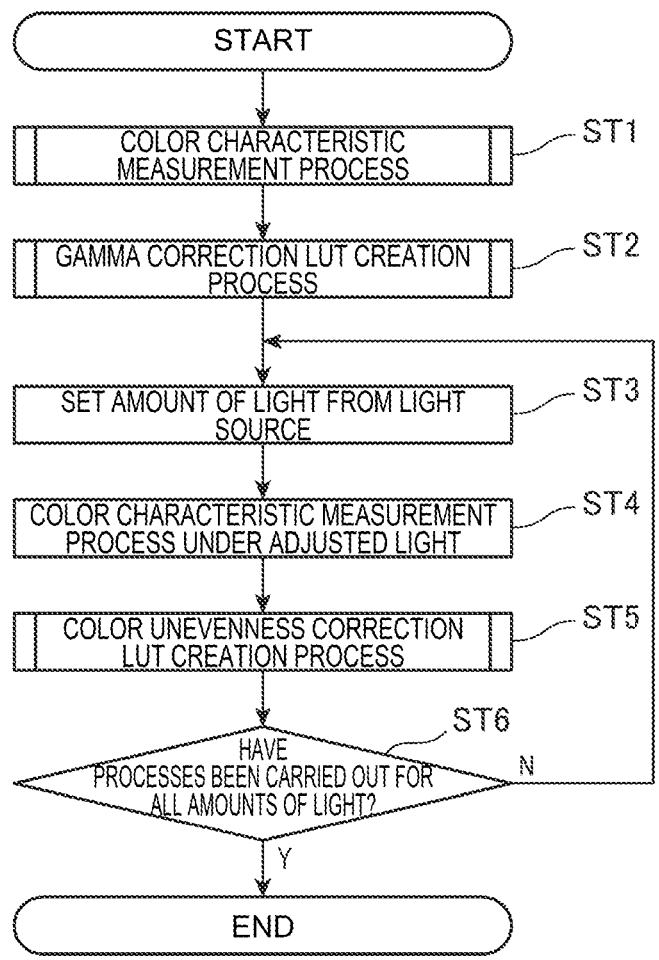
FIG. 5 is a flowchart showing processes of creating LUTs.
Figure 6:
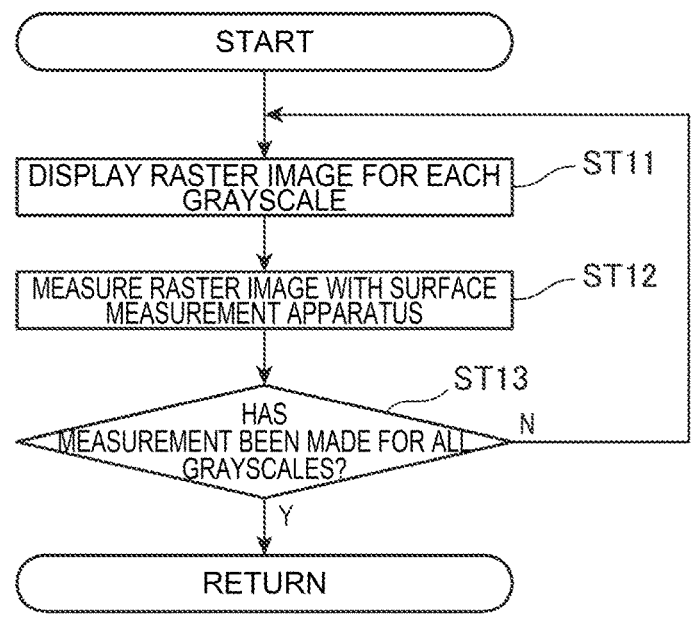
FIG. 6 is a flowchart showing one of the processes of creating LUTs.

First, the surface measurement apparatus 3 carries out a color characteristic measurement process (step ST1), as shown in FIG. 5. FIG. 6 shows the color characteristic measurement process in step ST1 in detail. First, the projector 1 displays (projects) a raster image for each grayscale as the projected image P (step ST11). The surface measurement apparatus 3 captures the raster image projected as the projected image P and creates in-plane two-dimensionally distributed image data on XYZ tristimulus values from the captured image data. The surface measurement apparatus 3 creates the data D11 representing the color characteristic (VT characteristic) at the grayscale from the created in-plane two-dimensionally distributed image data and outputs the data D11 to the image adjustment apparatus 4 (step ST12). The surface measurement apparatus 3 repeatedly carries out the processes in steps ST11 to ST12 for all of the grayscales set in advance (step ST13) and returns to step ST2 in FIG. 5 after the processes described above are carried out for all the grayscales.

At this point, the image adjustment apparatus 4 creates the gamma correction LUT 12A based on the color characteristic data D11 created by the surface measurement apparatus 3 (step ST2).

Figure 7:
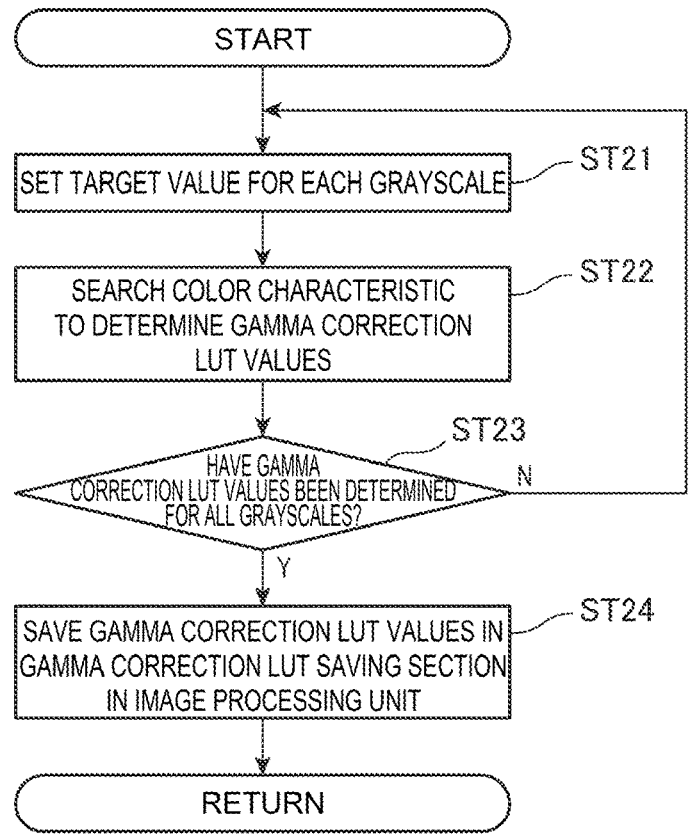
FIG. 7 is a flowchart showing one of the processes of creating LUTs.

FIG. 7 shows a gamma correction LUT creation process in step ST2 in detail. First, the gamma correction target computing section 41 sets target XYZ values for each of the grayscales (step ST21). Subsequently, the gamma correction LUT creating section 45 repeatedly performs matrix computation based on the gamma correction target values (target XYZ values) set by the gamma correction target computing section 41 to determine input RGB values that achieve grayscales of colors between black (minimum grayscale) to white (maximum grayscale). The computation is performed for all the grayscales (step ST23) to create the gamma correction LUT 12A. The created gamma correction LUT 12A is outputted from the image adjustment apparatus 4 to the projector 1 and saved in the gamma correction LUT saving section 12 (step S24), and the control returns to step ST3 in FIG. 5.

The projector 1 then uses the function of the light source luminance determining section 17 to adjust the luminance of the light source 31 to a value corresponding to an LUT to be created (step ST3). To create an LUT corresponding to 100% luminance, the luminance of the light source 31 is actually adjusted to 100%. The action of step ST3 is performed by the projector 1 controlled by the image supply apparatus 2, the surface measurement apparatus 3, the image adjustment apparatus 4, or any other apparatus.

The surface measurement apparatus 3 then carries out the processes in steps ST11 to ST13 shown in FIG. 6 again to produce the color characteristic after the luminance of the light source 31 is adjusted (step ST4).

The image adjustment apparatus 4 carries out a color unevenness correction LUT creation process of creating the color unevenness correction LUTs 15A to 15C based on the color characteristic data D11 created by the surface measurement apparatus 3 (step S5). The color unevenness correction LUT creation process will be described later with reference to FIG. 8.

An apparatus that controls the projector 1, the image supply apparatus 2, the surface measurement apparatus 3, and the image adjustment apparatus 4 evaluates whether or not the processes in steps ST1 to ST5 have been carried out for all the preset luminance values of the light source 31 (step ST6). For example, when the luminance of the light source 31 can be set stepwise, it is evaluated whether or not the processes in steps ST1 to ST5 have been carried out for each luminance level, and the LUT creation process is completed when the processes have been carried out for each luminance level.

Figure 8:
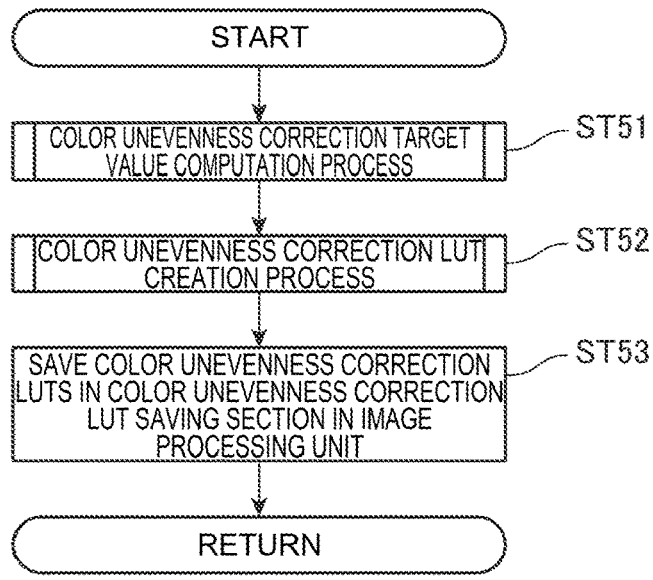
FIG. 8 is a flowchart showing one of the processes of creating LUTs.
Figure 9:
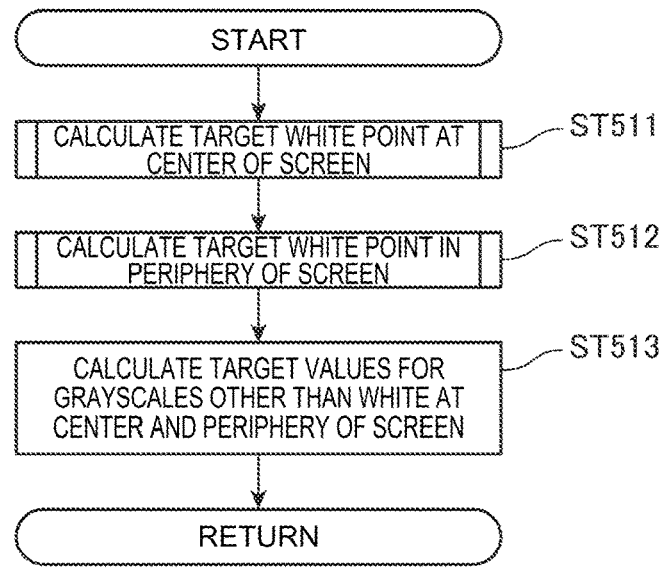
FIG. 9 is a flowchart showing one of the processes of creating LUTs.

FIG. 8 shows the color unevenness correction LUT creation process carried out in step ST5 (FIG. 5) in detail. First, the color unevenness correction target computing section 43 calculates target values for creating a color unevenness correction LUT (step ST51). FIG. 9 shows the process in step ST51 in detail. The color unevenness correction target computing section 43 calculates a target white point in a central portion of a frame (step ST511).

In step ST511, the color unevenness correction target computing section 43 sets the target white point to be the brightest point in the color gamut C1 and on the gray axis L* in FIG. 3 in the color unevenness correction LUT 15A corresponding to the case of 100% luminance. Further, to create the color unevenness correction LUT 15B for correction in which priority is placed on color uniformity, the color unevenness correction target computing section 43 sets the target white point to be the brightest point in the color gamut C11 and on the gray axis L*.

To create the color unevenness correction LUT 15C for correction in which priority is placed on brightness, the color unevenness correction target computing section 43 sets the target white point to be the brightest point in the color gamut C11 and on the gray axis L* and then moves the thus set target white point within the color gamut C11 and within the allowable range E1. When there is a brighter point within the color gamut C11, the color unevenness correction target computing section 43 sets again the target white point to be that point.

The color unevenness correction target computing section 43 then calculates a target white point in a peripheral portion of the frame (step ST512). In step ST512, the color unevenness correction target computing section 43 sets the target white point to be the brightest point in the color gamut C2 and on the gray axis L* in FIG. 3 in the color unevenness correction LUT 15A corresponding to the case of 100% luminance. Further, to create the color unevenness correction LUT 15B for correction in which priority is placed on color uniformity, the color unevenness correction target computing section 43 sets the target white point to be the brightest point in the color gamut C12 and on the gray axis L*.

To create the color unevenness correction LUT 15C for correction in which priority is placed on brightness, the color unevenness correction target computing section 43 sets the target white point to be the brightest point in the color gamut C12 and on the gray axis L* and then moves the thus set target white point within the color gamut C12 and within the allowable range E2. When there is a brighter point within the color gamut C12, the color unevenness correction target computing section 43 sets again the target white point to be that point. In this process, when the lightness of the target white point to be set again is higher than that of the target white point in the central portion of the frame having been set in step ST511, the color unevenness correction target computing section 43 sets the target white point in the central portion again. In this process, the color unevenness correction target computing section 43 searches for a point that has the same lightness as the lightness of the target white point having been set in step ST511 and is located within the color gamut C12 in a position close to that target white point and sets the target white point to the searched point.

In steps ST511 and ST512, the color unevenness correction target computing section 43 determines the XYZ tristimulus values of the thus determined target white points and uses the determined XYZ tristimulus values as target values.

The color unevenness correction target computing section 43 subsequently determines XYZ target values for grayscales of colors other than white based on the target white points calculated in steps ST511 and ST512 (step ST513). In step ST513, target values for each of the grayscales are so determined that a curve (reference character G in FIG. 3) is drawn from the target white point determined in each of steps ST511 and ST512 to a point representing black, that is, the lower end of the gray axis. After this process, the image adjustment apparatus 4 returns to step ST52 (FIG. 8).

Figure 10:
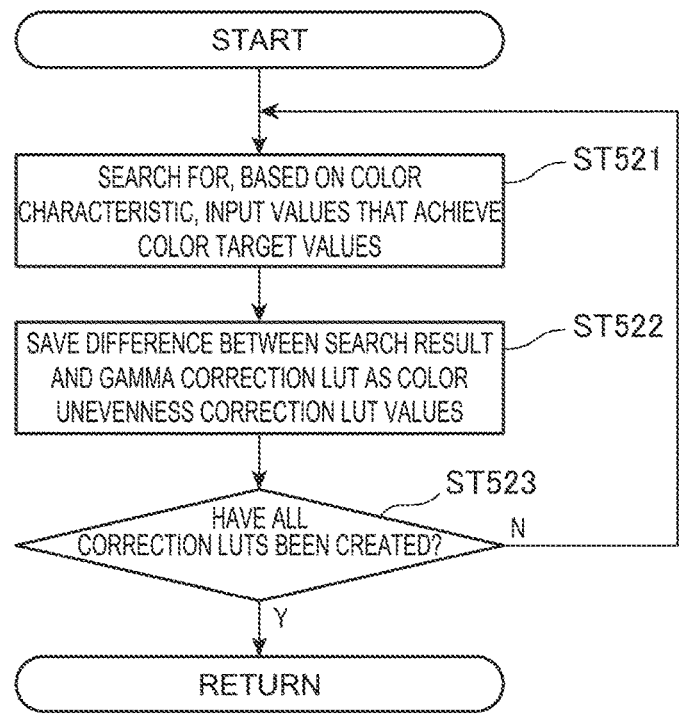
FIG. 10 is a flowchart showing one of the processes of creating LUTs.

The color unevenness correction LUT creating section 47 subsequently creates the color unevenness correction LUTs (step ST52). FIG. 10 shows the process in step ST52 in detail. The color unevenness correction LUT creation section 47 performs matrix computation based on the target XYZ values determined by the color unevenness correction target computing section 43 to search for input RGB values that achieve the target XYZ values (step ST521). The color unevenness correction LUT creating section 47 determines the difference between a result of the search and the gamma correction LUT 12A created by the gamma correction LUT creating section 45 in the gamma correction LUT creation process shown in FIG. 7 and saves the difference as a color unevenness correction LUT (step ST522). The color unevenness correction LUT creating section 47 carries out the processes in steps ST521 and ST522 for all the grayscales to create the color unevenness LUTs (step ST523).

The image adjustment apparatus 4 then returns to step ST53 (FIG. 8), outputs the color unevenness correction LUTs created by the color unevenness correction LUT creating section 47 to the projector 1, and saves the LUTs in the color unevenness correction LUT saving section 15 (step ST53).

As described above, the projector 1 according to the embodiment to which the invention is applied includes the image forming unit 30, which includes the light source 31, and the image processing unit 10. The image forming unit 30 displays the projected image P based on the inputted image data D1. The image processing unit 10 corrects the image data based on correction data. In this process, the image processing unit 10 switches the correction data between the color unevenness correction LUT 15B (first correction data) and the color unevenness correction LUT 15C (second correction data) to correct each color drawn by the modulator 32. The color unevenness correction LUT 15B is an LUT which enables correction in which a displayed color in the projected image P conforms to a reference color, and the color unevenness correction LUT 15C is an LUT which enables correction in which a displayed color in the projected image P conforms to a color within an allowable range set in advance.

Therefore, using the color unevenness correction LUT 15A or the color unevenness correction LUT 15B enables correction in which a displayed color in the projected image P conforms to a reference color for high color reproducibility and color uniformity. Further, using the color unevenness correction LUT 15C enables correction in which a displayed color conforms to a color within an allowable range. When the color unevenness correction LUT 15C is used, a displayed color can be so corrected that priority is placed, for example, on suppressing a decrease in brightness. In this case, since the color is corrected from a reference color to a color within an allowable range, there is no concern about degradation in color reproducibility or color uniformity. Therefore, two types of correction of a display color, that is, correction in which priority is placed on color reproducibility and color uniformity and correction in which priority is placed on suppressing a decrease in brightness, can be performed. Further, switching the two types of correction from one to the other allows priority to be placed, for example, on brightness or color reproducibility in accordance with user's request, whereby convenience to the user can be increased.

Further, the image forming unit 30 includes the modulator 32, which modulates the light emitted from the light source 32 based on image data to output the image light L2. The projector 1 includes the light source controller 34 as a light amount control section that controls the amount of image light to be projected on the screen SC. The light source controller 34 switches the state of light emitted from the light source 31 between a normal state in which the light source 31 is caused to emit rated light and an attenuated state in which the light source 31 is caused to emit attenuated light of lower luminance that that of the rated light. When the light source controller 34 causes the light source 31 to emit attenuated light, the amount of image light decreases. In the attenuated state, the image processing unit 10 performs correction by switching the color unevenness correction LUT between the color unevenness correction LUT 15B and the color unevenness correction LUT 15C, which enables correction in which priority is placed on the luminance of the projected image P and a displayed color in the projected image P conforms to a color within an allowable range set in advance. Therefore, when the amount of image light that forms the projected image P is reduced, each displayed color can be corrected with a decrease in the brightness of the projected image P suppressed.

Further, the color unevenness correction LUT 15B contains data which enables correction in which white in the projected image P in the case where the light source 31 is caused to emit attenuated light conforms to an achromatic color. The color unevenness correction LUT 15C contains data which enables correction in which white in the projected image P in the case where the light source 31 is caused to emit attenuated light conforms to a color within the allowable range E1 from a color having coordinates representing an achromatic color in the L*u*v* color space. The color unevenness correction LUT 15C therefore enables correction in which white in the projected image P conforms to an achromatic color for high color reproducibility and correction in which white in the projected image P is corrected to the extent that no unpleasant sensation occurs in such a way that, for example, a decrease in the brightness of the projected image P is suppressed.

Further, the image processing unit 10 includes the gamma correction LUT 12A, which enables gamma correction to be performed on an image drawn by the image forming unit 30 based on image data, and the color unevenness correction LUTs 15A to 15C, which enable correction in which in-plane color unevenness in the projected image P is corrected. Color reproducibility of the projected image P can therefore be enhanced and the color unevenness can be corrected in light-load processes for high-definition display.

Further, the image processing unit 10 may store a plurality of color unevenness correction LUTs 15B and a plurality of color unevenness correction LUTs 15C in correspondence with the luminance of the light emitted from the light source 31 driven by the light source controller 34. In this case, a color unevenness correction LUT corresponding to the luminance of the light source 31 may be selected. In this case, an image can be displayed with high color reproducibility and color uniformity in correspondence with a variety of changes in the luminance of the light source 31.

The embodiment described above is only an example of a specific aspect to which the invention is applied and does not limit the invention, and the invention is also applicable in the form of an aspect different from the embodiment described above. For example, as the light amount control section that controls the amount of image light outputted through the projection system 33, a light attenuator that attenuates the light L1 may be provided. As a specific configuration of the light attenuator, for example, a light blocker that blocks light can be provided on the optical path between the light source 31 and the modulator 32, and a driver that moves the light blocker to adjust the amount of light L1 can be provided. Instead, as the light amount control section, a filter that transmits the light L1 may be provided on the optical path between the light source 31 and the modulator 32, and a mechanism that changes the transmittance of the filter may be provided. A filter of this type can instead be provided on the optical path between the modulator 32 and the projection system 33 or in the projection system 33. Using the configuration described above allows the amount of image light projected onto the screen SC to be controlled without any change in the luminance of the light emitted from the light source 31.

Further, in the embodiment described above, the projector 1 has been described with reference to the configuration in which image data is corrected for prevention of color shift and color unevenness in the projected image P resulting from the color characteristic of the liquid crystal light valves in the modulator 32. The invention is not limited to the configuration and is applicable to any display apparatus that displays an image by using light emitted from a light source and corrects image data to prevent color shift and color unevenness in a displayed image.

Further, the functional sections of the projector 1 and the peripheral apparatus shown in FIG. 1 show a functional configuration and are not necessarily implemented in a specific manner. That is, it is not necessary to implement individual hardware corresponding to each of the functional sections, and a single processor can, of course, execute a program to achieve the functions of the plurality of functional sections. Further, in the embodiment described above, part of a function achieved by software may be achieved by hardware, or part of a function achieved by hardware may be achieved by software. In addition, a specific detailed configuration of each of the other portions of the projector 1 can be arbitrarily changed to the extent that the change does not depart from the substance of the invention.

What is claimed is:

1. A display apparatus comprising:
a display section that displays a displayed image formed by image light based on image data and includes
a light source that emits light,
a modulation section that modulates, based on the image data, light emitted from the light source to produce the image light, and
a light amount control section that controls the amount of light emitted by the light source; and
an image correction section that corrects the image data based on correction data,
wherein, when the light amount control section reduces the amount of light emitted by the light source, the image correction section corrects a color in the image by switching the correction data from first correction data which enables correction in which a displayed color in the displayed image conforms to a reference color to second correction data which enables correction in which priority is placed on luminance of the displayed image and a displayed color in the displayed image conforms to a color within an allowable range set in advance.

2. The display apparatus according to claim 1, wherein the first correction data contains data which enables correction in which white in the displayed image in the case where the amount of the image light is reduced conforms to an achromatic color, and
the second correction data contains data which enables correction in which white in the displayed image in the case where the amount of the image light is reduced conforms to a color within the allowable range from a color having coordinates representing an achromatic color in an L*u*v* color space.

3. The display apparatus according to claim 1, wherein each of the first correction data and the second correction data is a color unevenness correction lookup table ("LUT") which enables correction of in-plane color unevenness in the displayed image, and the image correction section uses not only a gamma correction LUT which enables gamma correction of an image drawn by the display section based on the image data but also the color unevenness correction LUTs to correct the image.

4. The display apparatus according to claim 1, wherein the image correction section corrects the color in the image by switching the correction data from the first correction data formed of a plurality of sets of first correction data corresponding to the amount of the image light to the second correction data formed of a plurality of sets of second correction data corresponding to the amount of the image light.

5. The display apparatus according to claim 1, wherein the modulation section modulates the light emitted from the light source by displaying an image based on the image data, and the image correction section corrects the color in the image displayed by the modulation section based on the first or second correction data.

6. The display apparatus according to claim 1, further comprising a correction data creation section that creates at least the second correction data based on a displayed color in the displayed image in the case where the light amount control section reduces the amount of the image light.

7. A method for controlling a display apparatus that displays a displayed image formed by image light based on image data and includes a light source that emits light, a modulation section that modulates, based on the image data, light emitted from the light source to produce the image light, and a light amount control section that controls the amount of the image light, the method comprising:

performing an image correction process of correcting a color in the displayed image based on correction data; and performing, when the light amount control section reduces the amount of the image light, the correction in the image correction process by switching the correction data from first correction data which enables correction in which a displayed color in the displayed image conforms to a reference color to second correction data which enables correction in which priority is placed on luminance of the displayed image and a displayed color in the displayed image conforms to a color within an allowable range set in advance.

* * * * *